US012109807B2

(12) United States Patent
Yoshino et al.

(10) Patent No.: US 12,109,807 B2
(45) Date of Patent: Oct. 8, 2024

(54) LIQUID DISCHARGE APPARATUS

(71) Applicant: BROTHER KOGYO KABUSHIKI KAISHA, Nagoya (JP)

(72) Inventors: Takaaki Yoshino, Nagoya (JP); Taisuke Mizuno, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 77 days.

(21) Appl. No.: 18/057,343

(22) Filed: Nov. 21, 2022

(65) Prior Publication Data

US 2023/0158794 A1 May 25, 2023

(30) Foreign Application Priority Data

Nov. 25, 2021 (JP) ................................ 2021-190956

(51) Int. Cl.
*B41J 2/045* (2006.01)

(52) U.S. Cl.
CPC ....... *B41J 2/04541* (2013.01); *B41J 2/04581* (2013.01)

(58) Field of Classification Search
CPC ................ B41J 2/04541; B41J 2/04581; B41J 2/04588; B41J 2/04596
See application file for complete search history.

(56) References Cited

U.S. PATENT DOCUMENTS 7,410,232 B2 * 8/2008 Takahashi ............ B41J 2/04593 347/11
2006/0244772 A1 * 11/2006 Sekiguchi ............ B41J 2/04581 347/10
2010/0182362 A1 * 7/2010 Suzuki ................ B41J 2/04588 347/11

FOREIGN PATENT DOCUMENTS

JP 2000-280463 A 10/2000
JP 2015120336 A * 7/2015 .......... B41J 2/04581
JP 2019123098 A * 7/2019 .......... B41J 2/04541

* cited by examiner

*Primary Examiner* — Sharon Polk
(74) *Attorney, Agent, or Firm* — Scully, Scott, Murphy & Presser, PC

(57) ABSTRACT

A liquid discharge apparatus includes a channel member defining a nozzle and a pressure chamber in communication with the nozzle; an actuator which applies pressure to liquid in the pressure chamber, and a controller which applies a drive signal to the actuator. The drive signal includes a rectangular main pulse and a rectangular cancel pulse applied after the main pulse within one discharge period. The actuator is driven by the drive signal in a pull-and-push method to discharge the liquid from the nozzle. If f (kHz) refers to a drive frequency of the drive signal, if Tw (μsec) refers to a time length from a falling edge of the main pulse to a rising edge of the cancel pulse, and if Tc (μsec) refers to a pulse width of the cancel pulse, then the following expression holds: $50 \leq f \leq -11.3 \times (Tw+Tc)+120$.

9 Claims, 6 Drawing Sheets

LIQUID DISCHARGE APPARATUS

REFERENCE TO RELATED APPLICATIONS

This application claims priority from Japanese Patent Application No. 2021-190956 filed on Nov. 25, 2021. The entire content of the priority application is incorporated herein by reference.

BACKGROUND ART

Conventionally, there is known an ink jet apparatus (liquid discharge apparatus) configured to generate pressure wave inside an ink flow channel by way of applying a drive signal to an actuator to discharge ink from a nozzle. In such an ink jet apparatus, the drive signal has three pulse signals in total consisted of two jet pulse signals and one non-jet pulse signal for a printing command per one dot (within one discharge period).

DESCRIPTION

In recent years, liquid discharge apparatuses are required for driving the actuator at high frequency from the point of view of high-speed recording. If the frequency of the drive signal is 20 kHz or so, then it is possible to discharge liquid stably from the nozzle according to the drive signal as described above. However, if the frequency of the drive signal is further raised, then the discharges may be unstable with the drive signal as described above.

An object of the present disclosure is to provide a liquid discharge apparatus capable of realizing stable discharges under a condition that the actuator is driven at high frequency.

According to an aspect of the present disclosure, there is provided a liquid discharge apparatus including:

a channel member defining a nozzle and a pressure chamber in communication with the nozzle;

an actuator configured to apply pressure to liquid in the pressure chamber; and a controller configured to apply a drive signal to the actuator, wherein the drive signal includes a rectangular main pulse and a rectangular cancel pulse applied after the main pulse within one discharge period for forming one dot, the cancel pulse being smaller in pulse width than the main pulse, the actuator is driven by the drive signal in a pull-and-push method such that the liquid is discharged from the nozzle by increasing volume of the pressure chamber from a predetermined volume and then decreasing the volume of the pressure chamber to the predetermined volume or less, and if f (kHz) refers to a drive frequency of the drive signal, if Tw (μsec) refers to a time length from a falling edge of the main pulse to a rising edge of the cancel pulse, and if Tc (μsec) refers to a pulse width of the cancel pulse, then the following expression holds:

$$50 \leq f \leq -11.3 \times (Tw+Tc)+120.$$

Figure 1:
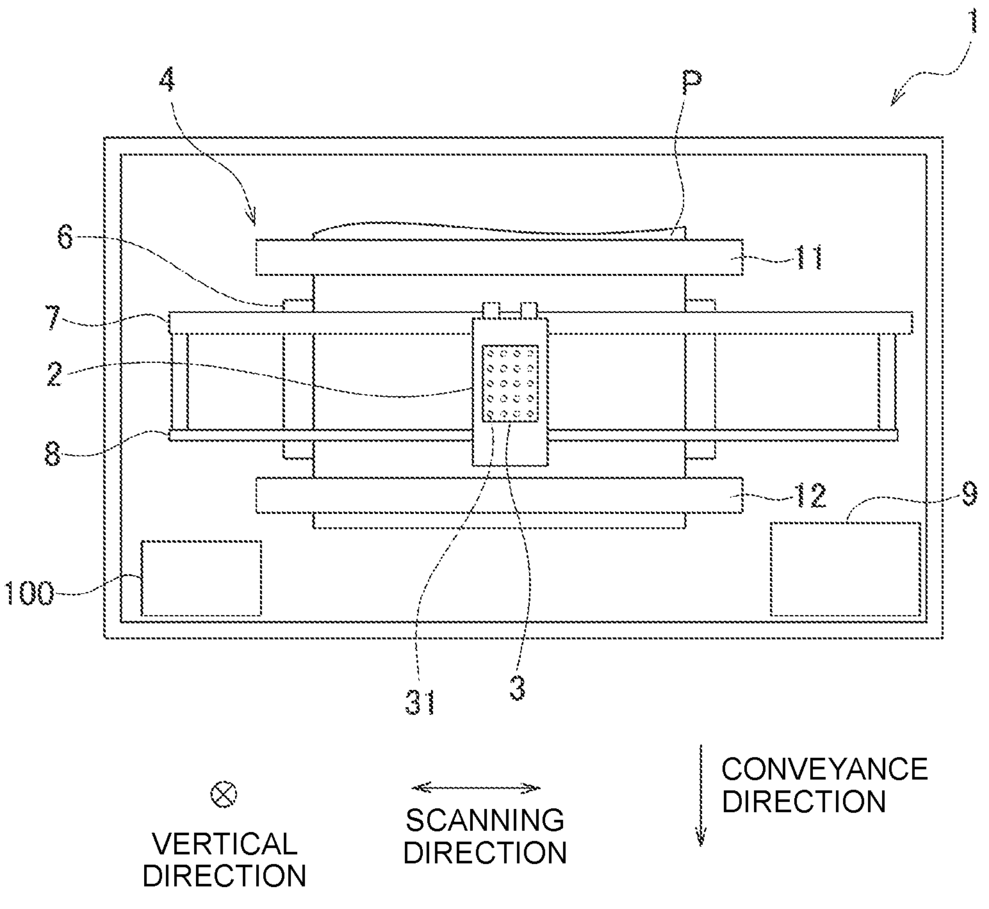
FIG. 1 is a schematic plan view of a printer according to an embodiment of the present disclosure.

A printer 1 according to an embodiment of the present disclosure includes, as depicted in FIG. 1, a carriage 2 being movable in a scanning direction (a direction orthogonal to a vertical direction) while holding a head 3, a platen 6 supporting paper P below the head 3 and the carriage 2, a conveying mechanism 4 conveying the paper P in a conveyance direction (a direction orthogonal to the conveyance direction and the vertical direction), and a controller 100. A plurality of nozzles 31 are formed in the lower surface of the head 3. In this embodiment, the resolution of images formed with an ink discharged from the nozzles 31 is 1,200 dpi or more. The plurality of nozzles 31 align in the conveyance direction (the direction of relative displacement between the paper P being a recording medium and the plurality of nozzles 31), at a density of 50 dpi or more.

The carriage 2 is supported by a pair of guide rails 7 and 8 extending in the scanning direction. When driven by a carriage motor 2M under the control of the controller 100, the carriage 2 is moved in the scanning direction along the guide rails 7 and 8.

The conveying mechanism 4 includes two roller pairs 11 and 12 arranged in positions to interpose the platen 6 and the carriage 2 therebetween in the conveyance direction. The roller pairs 11 and 12 are driven by a conveyance motor 4M (see FIG. 4) under the control of the controller 100 to rotate with the paper P being nipped therebetween. By virtue of this, the paper P is conveyed in the conveyance direction.

Figure 2:
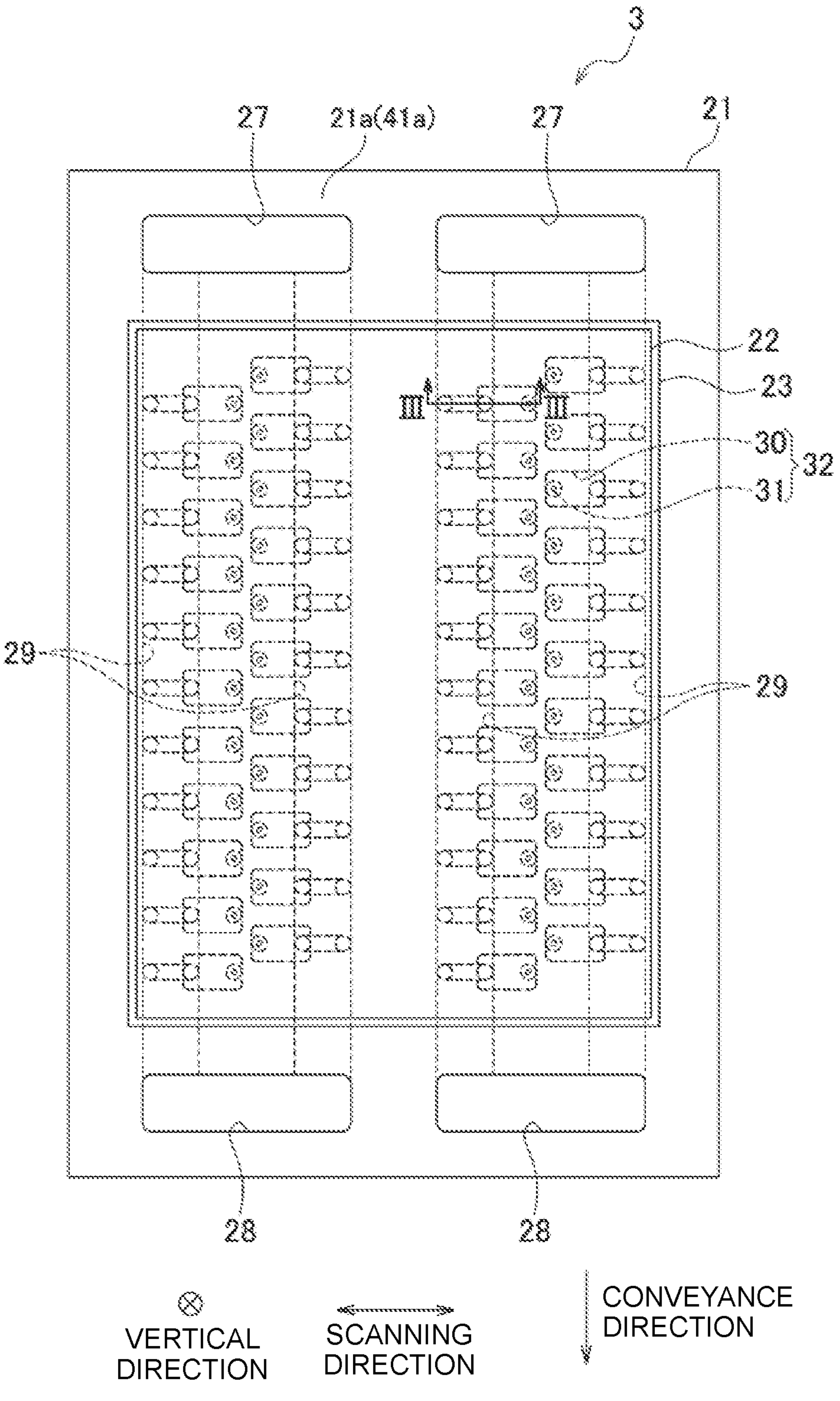
FIG. 2 is a plan view of a head included in the printer.
Figure 3:
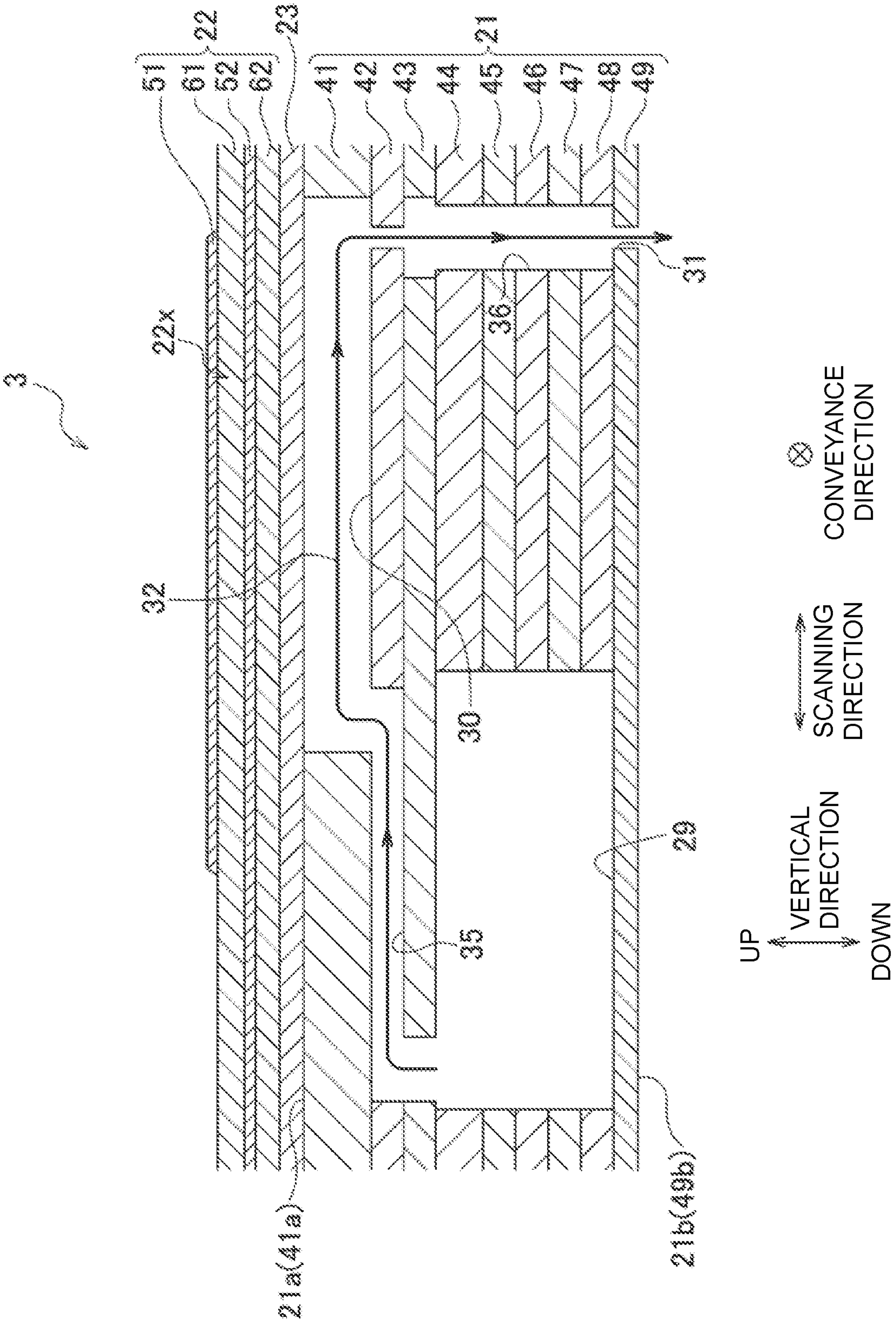
FIG. 3 is a cross section view of the head along the line of FIG. 2.

As depicted in FIGS. 2 and 3, the head 3 includes a flow channel member 21, an actuator member 22 arranged on a surface 21*a* of the flow channel member 21, and a sealing member 23 arranged between the flow channel member 21 and the actuator member 22.

The flow channel member 21 is constructed from, as depicted in FIG. 3, nine plates 41 to 49. The plates 41 to 49 are stacked on each other in the vertical direction (the thickness direction of each of the plates 41 to 49). The plates 41 to 49 are made of a metallic material (stainless steel or the like).

A plurality of pressure chambers 30 are formed in the plate 41. The plurality of nozzles 31 are formed in the plate 49. The plate 41 has a surface 41*a* which serves as the surface 21*a* of the flow channel member 21, whereas the plate 49 has a backside surface 49*b* which serves as the backside surface 21*b* of the flow channel member 21. The plurality of pressure chambers 30 are open at the surface 21*a* whereas the plurality of nozzles 31 are open at the backside surface 21*b*.

Four common flow channels 29 (see FIG. 2) are formed in the plates 44 to 48. A communication flow channel 35 is formed in the plates 42 and 43 for communication between each pressure chamber 30 and the corresponding common flow channel 29. A connection flow channel 36 is formed in the plates 42 to 48 for connection between each pressure chamber 30 and the corresponding nozzle 31.

The four common flow channels 29 extend respectively in the conveyance direction, as depicted in FIG. 2, and align in the scanning direction. The common flow channels 29 are provided according to each pressure chamber array formed from the plurality of pressure chambers 30 arrayed in the conveyance direction. From each common flow channel 29, the ink is supplied to the plurality of pressure chambers 30 belonging to each pressure chamber array via the communication flow channels 35 (see FIG. 3). Then, as will be described later on, each actuator 22*x* of the actuator member 22 undergoes a deformation to apply a pressure to the ink in the pressure chamber 30 such that the ink is discharged from the nozzle 31 through the connection flow channel 36.

In this manner, the flow channel member 21 is formed therein with the four common flow channels 29, and a plurality of individual flow channels 32 in respective communication with the common flow channels 29 (the plurality of individual flow channels 32 being the flow channels including the pressure chambers 30 and the nozzles 31, and being the flow channels from the exits of the common flow channels 29 to the nozzles 31 through the communication flow channels 35, the pressure chambers 30, and the connection flow channels 36).

As depicted in FIG. 2, two supply ports 27 and two feedback ports 28 are formed in the surface 21*a* of the flow channel member 21. The two supply ports 27 are arranged on the upstream side of the four common flow channels 29 in the conveyance direction. The two feedback ports 28 are arranged on the downstream side of the four common flow channels 29 in the conveyance direction. The supply ports 27 and the feedback ports 28 are in respective communication with an ink tank 9 (see FIG. 1) via tubes or the like. Each supply port 27 is in communication with two common flow channels 29 adjacent to each other in the scanning direction to supply the ink to the two common flow channels 29 from the ink tank 9. Each feedback port 28 is in communication with the other two common flow channels 29 adjacent to each other in the scanning direction to feed the ink back to the ink tank 9 from the two common flow channels 29.

The actuator member 22 is arranged centrally on the surface 21*a* of the flow channel member 21 to cover all pressure chambers 30 open at the surface 21*a* but not cover the supply ports 27 and the feedback ports 28. The actuator member 22 includes, as depicted in FIG. 3, two piezoelectric layers 61 and 62, a common electrode 52, and a plurality of individual electrodes 51. The piezoelectric layers 61 and 62 and the common electrode 52 define the contour of the actuator member 22 depicted in FIG. 2, which is rectangular and one size smaller than the flow channel member 21 as viewed from the vertical direction. On the other hand, each pressure chamber 30 is provided with an individual electrode 51 which overlaps in the vertical direction with the corresponding pressure chamber 30.

Figure 4:
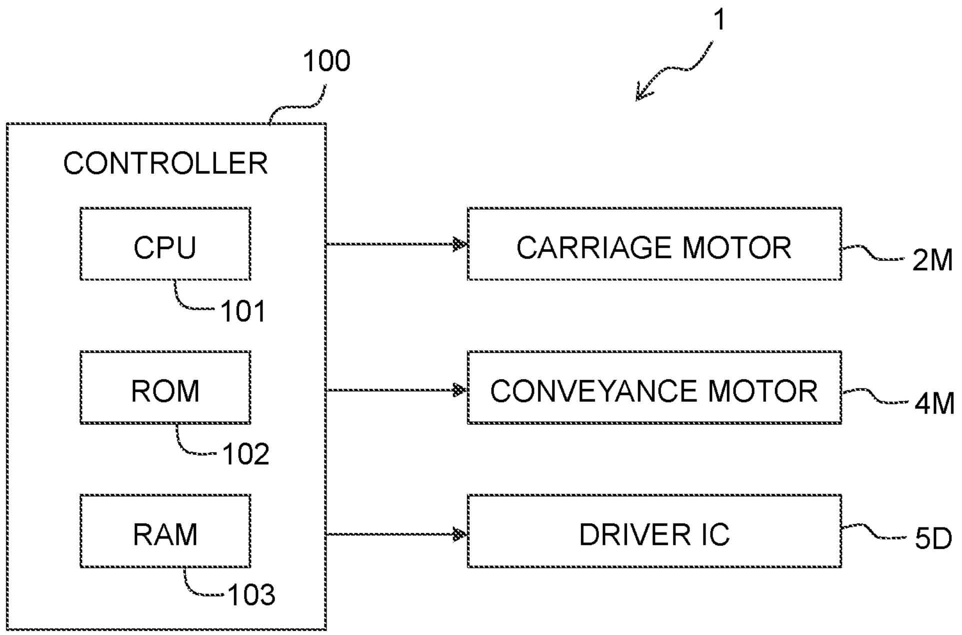
FIG. 4 is a block diagram depicting an electric configuration of the printer.

The plurality of individual electrodes 51 and the common electrode 52 are connected electrically with the driver IC 5D (see FIG. 4). The driver IC 5D keeps the common electrode 52 at the grounding potential while causing the individual electrodes 51 to change between a predetermined drive potential and the grounding potential. In particular, the driver IC 5D generates a drive signal on the basis of a control signal from the controller 100, and supplies the drive signal to the individual electrodes 51. By virtue of this, the individual electrodes 51 change between the predetermined drive potential and the grounding potential. On this occasion, in the piezoelectric layer 61, the parts interposed between the individual electrodes 51 and the common electrode 52 (the actuators 22*x*) contract in a planar direction due to a piezoelectric transversal effect. Along with this, in the actuator member 22 and the sealing member 23, the parts overlapping in the vertical direction with the pressure chambers 30 deform to project toward the pressure chambers 30 such that the pressure chambers 30 decrease in volume and a pressure is applied to the ink in the pressure chambers 30. Therefore, the ink is discharged from the nozzles 31 through the connection flow channels 36. At the same time, the ink in the common flow channels 29 is supplied to the pressure chambers 30 through the communication flow channels 35; furthermore, from the ink tank 9, the ink is supplied to the common flow channels 29.

The plurality of actuators 22*x* formed in the actuator member 22 function as unimorph type actuators capable of deformation independently according to the voltage application of the driver IC 5D to each individual electrode 51.

As depicted in FIG. 2, in the same manner as the actuator member 22, the sealing member 23 is arranged centrally on the surface 21*a* of the flow channel member 21 to cover all pressure chambers 30 open at the surface 21*a* but not cover the supply ports 27 and the feedback ports 28. The sealing member 23 is rectangular and one size smaller than the flow channel member 21 but one size larger than the actuator member 22 as viewed from the vertical direction. The sealing member 23 is attached on the surface 21*a* with an adhesive to seal up the pressure chambers 30. The sealing member 23 is made of a different material from the piezoelectric layers 61 and 62 (of a material of low ink permeability such as stainless steel or the like), without the parts functioning as actuators.

In this embodiment, each of the piezoelectric layers 61 and 62 is as thick as 10 μm or more, the sealing member 23 is also as thick as 10 μm or more, and each of the electrodes 51 and 52 is as thick as 0.5 to 1.5 μm or more.

The controller 100 includes, as depicted in FIG. 4, a CPU (Central Processing Unit) 101, a ROM (Read Only Memory) 102, and a RAM (Random Access Memory) 103. The ROM 102 stores programs and data for the CPU 101 to carry out various controls. The RAM 103 temporarily stores data for the CPU 101 to use in executing a program. The CPU 101 carries out the various controls according to the programs and data stored in the ROM 102 and the RAM 103 on the basis of the data inputted from an external device (a personal computer or the like) or from an input unit (switches and/or buttons provided on the outer surface of the casing of the printer 1).

Figure 5:
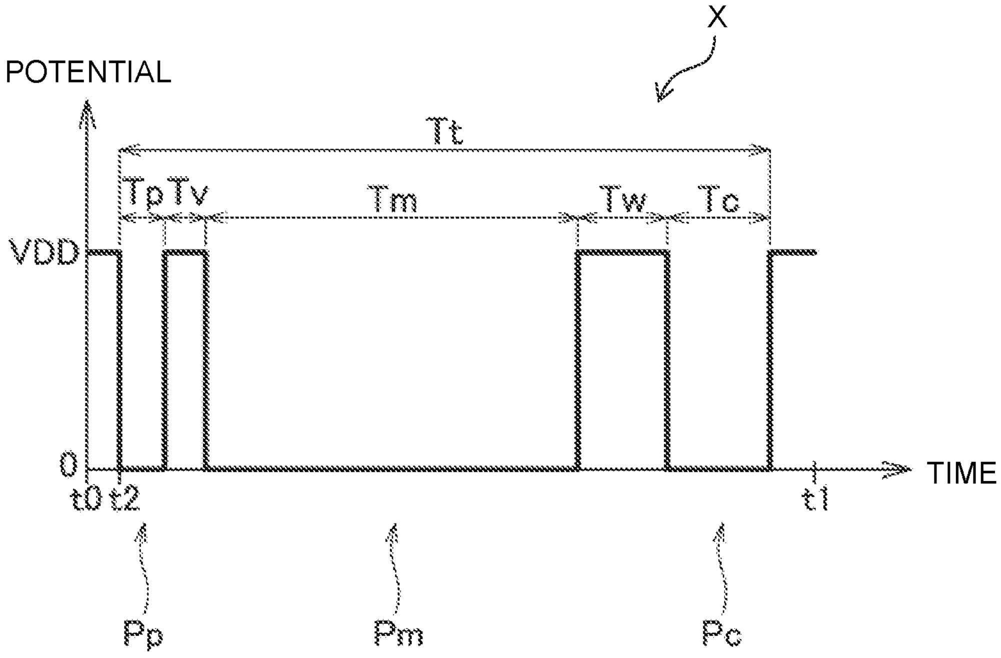
FIG. 5 is a graph depicting a drive signal supplied to an actuator by a driver IC of the head.

FIG. 5 depicts an example of the drive signal which is supplied by the driver IC 5D to the individual electrodes 51 under the control of the controller 100. The drive signal X depicted in FIG. 5 includes three pulses in respective rectangular shapes within one discharge period for forming one dot (from the point of time t0 to the point of time t1). These three pulses are consisted of a main pulse Pm, a prepulse Pp applied before the main pulse Pm, and a cancel pulse Pc applied after the main pulse Pm. The main pulse Pm serves for discharging liquid droplets in a predetermined size from the nozzles 31 within one discharge period. It is preferable for the main pulse Pm to have a pulse width Tm near to AL (Acoustic Length: reciprocating conveyance time for the pressure wave in the individual flow channels 32), from the point of view of raising the discharge pressure. The prepulse Pp and the cancel pulse Pc serve for suppressing satellites and mists and have pulse widths Tp and Tc smaller than the pulse width Tm of the main pulse Pm.

In this embodiment, in the initial state (at the time t0), the predetermined drive potential (VDD) is applied to the individual electrodes 51, so that in the piezoelectric layer 61, the parts interposed between the individual electrodes 51 and the common electrode 52 (the actuators 22*x*) contract in the planar direction. Therefore, in the actuator member 22 and the sealing member 23, the parts overlapping in the vertical direction with the pressure chambers 30 deform to project toward the pressure chambers 30. Then, at the timing of the main pulse Pm rising up for the individual electrodes 51 to reach the grounding potential (0V), the actuators 22*x* are released from contracting in the planar direction to let the abovementioned parts become flat. By virtue of this, the pressure chambers 30 each increase in volume to be larger than that in the initial state such that the ink is inhaled into the individual flow channels 32 from the common flow channels 29. Further, after that, when the main pulse Pm falls down and the drive potential (VDD) is applied to the individual electrodes 51, the actuators 22*x* contract in the planar direction again such that those parts deform again to project toward the pressure chambers 30. On this occasion, the pressure on the ink increases due to the decrease of the volume of the pressure chambers 30 such that the ink is discharged from the nozzles 31.

Note that the term "rising edge" of a pulse refers to a potential change from the potential of the initial state to a predetermined potential of that pulse. The term "falling edge" of a pulse refers to a potential change from the predetermined potential to the potential of the initial state of that pulse. In this embodiment, because the "pull-and-push" method is adopted, as depicted in FIG. 5, the potential decreases at the rising edge of the pulse whereas the potential increases at the falling edge of the pulse.

That is, in this embodiment, as the method for driving the actuators 22*x*, a "pull-and-push" method is adopted to discharge the ink from the nozzles 31 by way of first increasing the volume of the pressure chamber 30 from a predetermined volume and then decreasing the volume to the predetermined volume or less. In the "pull-and-push" method, when the volume of a pressure chamber 30 increases, a negative pressure wave arises in the pressure chamber 30, and then at the timing when the negative pressure wave is inversed to return to the pressure chamber 30 as a positive pressure wave, the volume of the pressure chamber 30 is reduced such that by giving rise to the positive pressure wave in the pressure chamber 30, those pressure waves overlap. With the pressure waves overlapping in this manner, a large pressure is applied to the ink in the pressure chamber 30 such that it is possible to raise the discharge pressure.

Further, in recent years, from the point of view of high-speed recording, it is required that the actuators 22*x* be driven at high frequency. However, with the drive signal X including the rectangular main pulse Pm and the rectangular cancel pulse Pc within one discharge period as depicted in FIG. 5, if the frequency is 50 kHz or higher, then the discharges can be unstable.

The present inventors have found, through their devoted research, that the sum of Tw (the time length from a falling edge of the main pulse Pm to a rising edge of the cancel pulse Pc) and Tc (the pulse width of the cancel pulse Pc) correlates with the limiting frequency Fl (the limiting frequency at which successively discharged ink droplets are disconnected and the dots are formed independently according to each ink droplet).

Figure 6:
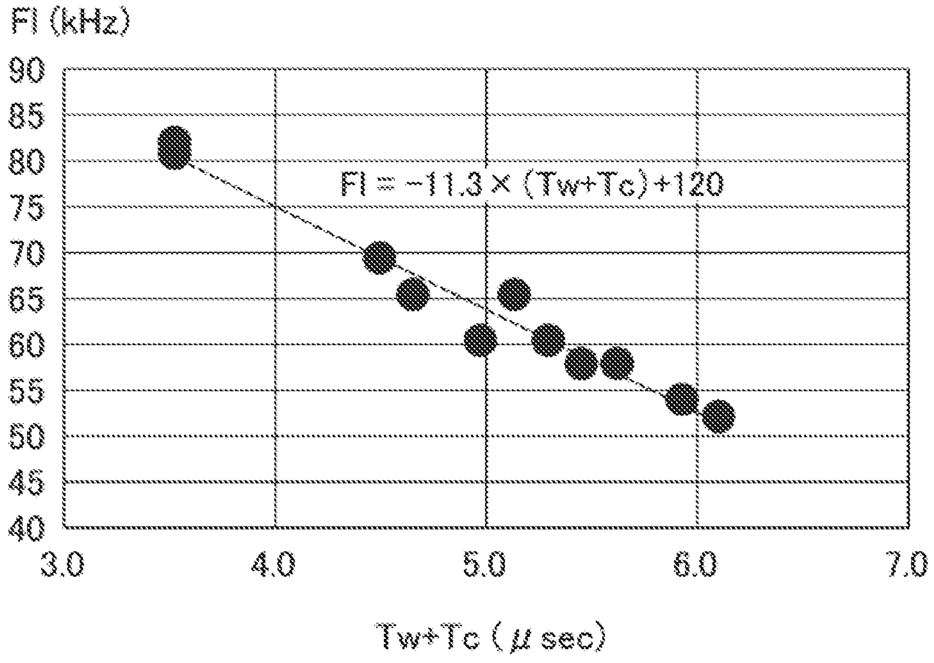
FIG. 6 is a graph depicting a relationship between a limiting frequency and a time related to a cancel pulse included in the drive signal.
Figure 7:
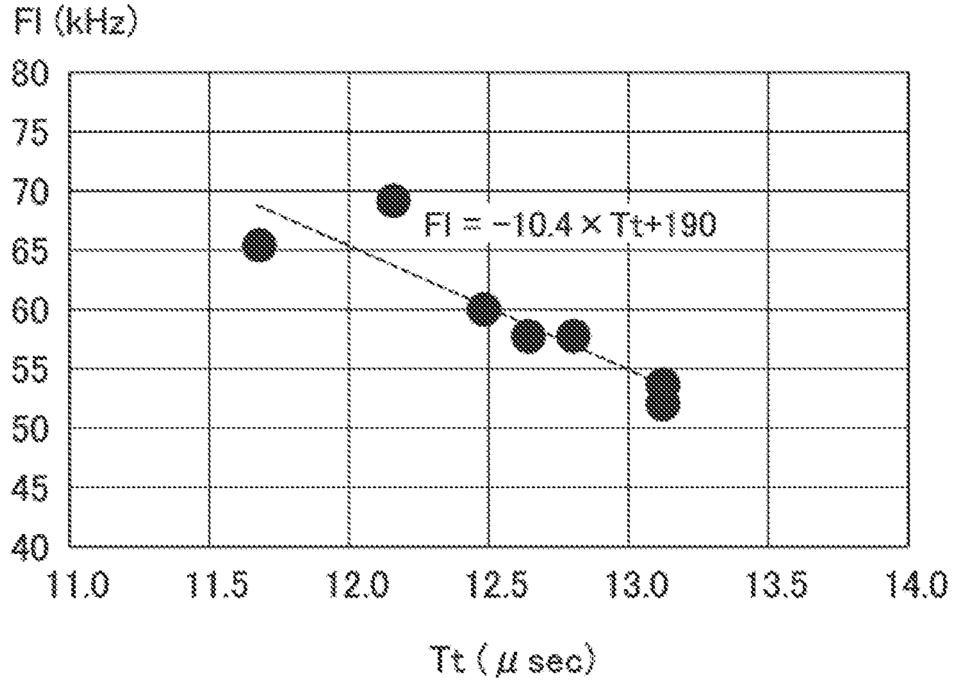
FIG. 7 is a graph depicting a relationship between the limiting frequency and a total time related to three pulses included in the drive signal.

FIG. 6 depicts a relationship between Tw+Tc related to the cancel pulse Pc, and the limiting frequency Fl. FIG. 7 depicts a relationship between the total time Tt (=Tp+Tv+Tm+Tw+Tc) related to the three pulses Pp, Pm, and Pc, and the limiting frequency Fl. FIGS. 6 and 7 plot the respective values of the limiting frequency Fl when the actuator 22*x* is driven by using a plurality of drive signals X where at least some of the following items are different from each other: Tp (the pulse width of the prepulse Pp), Tv (the time length from the falling edge of the prepulse Pp to the rising edge of the main pulse Pm), Tm (the pulse width of the main pulse Pm), Tw (the time length from the falling edge of the main pulse Pm to the rising edge of the cancel pulse Pc), and Tc (the pulse width of the cancel pulse Pc). Further, in FIGS. 6 and 7, while the expression of a regression analysis on the limiting frequency Fl is depicted with a broken line, it is understood that compared to the expression "−10.4×Tt×190" depicted in FIG. 7, the expression "−11.3×(Tw+Tc)+120" depicted in FIG. 6 renders a closer approximation of the actual limiting frequency Fl.

Therefore, in this embodiment, let f be the drive frequency (kHz) of the drive signal X, Tw be the time length (μsec) from the falling edge of the main pulse Pm to the rising edge of the cancel pulse Pc, and Tc be the pulse width (μsec) of the cancel pulse Pc. Then, the following expression (1) holds (in other words, in the case of the drive at any frequency f equal to or higher than 50 kHz, Tw+Tc is set to let the following expression (1) hold). By virtue of this, it is possible to realize stable discharges by the drive at high frequency.

$$50 \leq f \leq -11.3 \times (Tw+Tc)+120 \quad (1)$$

Further, the present inventors have also paid attention to the displacement of meniscus formed in the nozzles 31, and found that the limiting frequency Fl correlates with the product of the maximum displacement Q (see FIG. 8) of meniscus occurring after applying the cancel pulse Pc, and the time Tq from the start point t2 (see FIG. 5) of applying the drive signal X to the point tq of the maximum displacement Q occurring within one discharge period.

Figure 8:
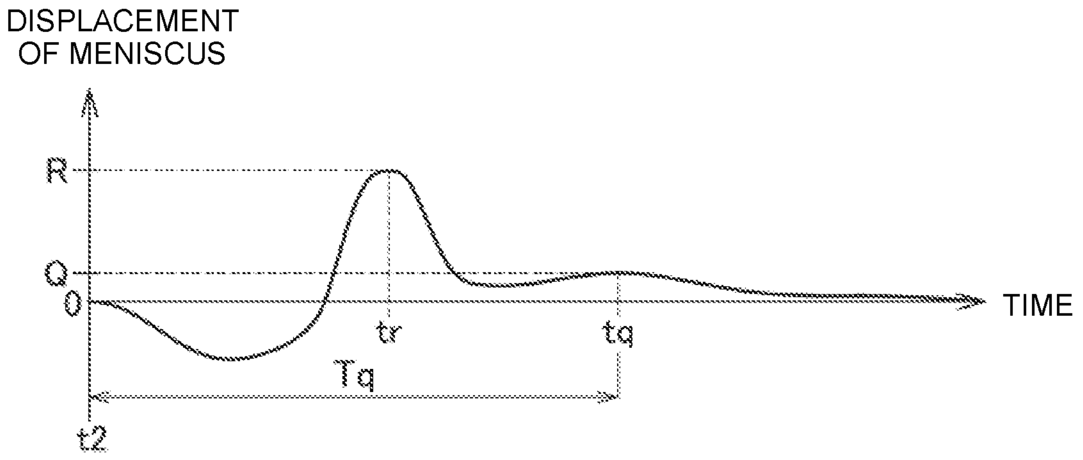
FIG. 8 is a graph depicting a displacement of meniscus along with applying the drive signal.
Figure 9:
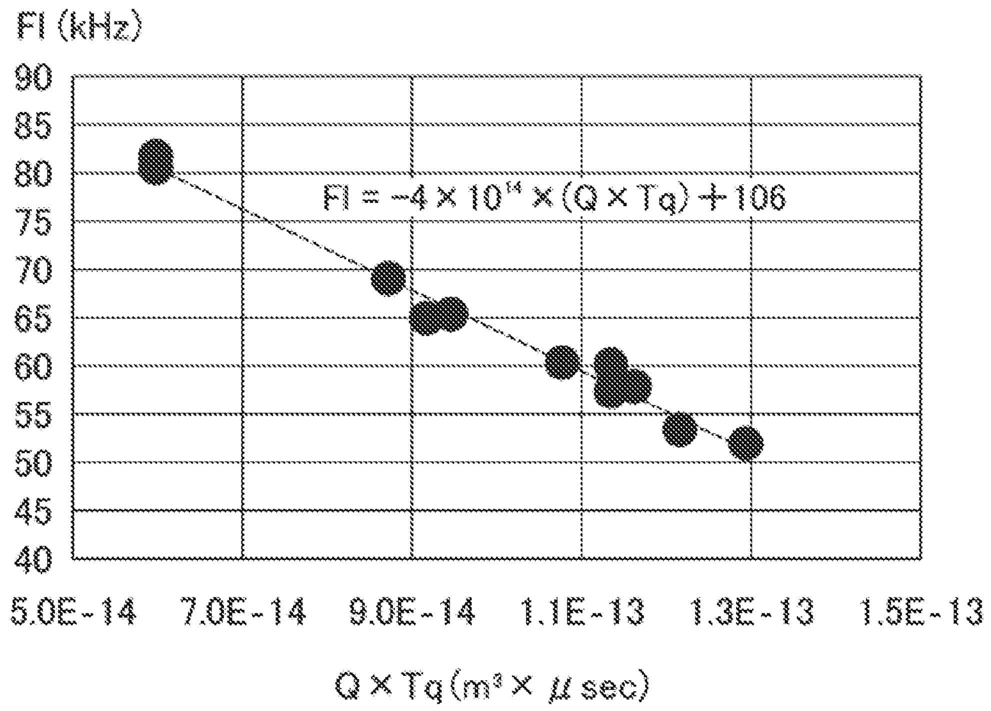
FIG. 9 is a graph depicting a relationship between the limiting frequency, and the product of the maximum displacement of meniscus occurring after applying the cancel pulse, and the time from the start point of applying the drive signal to the point of the maximum displacement occurring.

FIG. 8 depicts the displacement of meniscus along with the application of the drive signal X. In FIG. 8, R refers to the maximum displacement of meniscus occurring after applying the main pulse Pm, and tr refers to the point of time when the maximum displacement R occurs. FIG. 9 depicts a relationship between the limiting frequency Fl and the product of Q and Tq. Like FIGS. 6 and 7, FIG. 9 plots the respective values of the limiting frequency Fl when a plurality of drive signals X are used where at least some of the following items are different from each other: Tp, Tv, Tm, Tw, and Tc (see FIG. 5). Further, while the expression "$-4\times10^{14}$×(Q×Tq)+106" of a regression analysis on the limiting frequency Fl is depicted with a broken line, it is understood that this expression renders an approximation of the actual limiting frequency Fl.

Therefore, in this embodiment, let Q ($m^3$) be the maximum displacement after applying the cancel pulse Pc, and let Tq (μsec) be the time length from the start point t2 (see FIG. 5) of applying the drive signal X to the point tq of the maximum displacement Q occurring within one discharge period. Then, the following expression (2) holds (in other words, in the case of the drive at any frequency f equal to or higher than 50 kHz, Tq is set to let the following expression (2) hold). By virtue of this, it is possible to realize stable discharge further reliably by the drive at high frequency.

$$f \leq -4\times10^{14} \times (Q \times Tq)+106 \quad (2)$$

In this embodiment, the resolution of images formed with the ink discharged from the nozzles 31 is 1,200 dpi or more.

In order to realize a high resolution at 1,200 dpi or more, the drive at high frequency is effective. Hence, letting the above expressions (1) and (2) hold, it is possible to realize stable discharges by the drive at high frequency.

The plurality of nozzles 31 align in the conveyance direction (the direction of relative displacement between the paper P being a recording medium and the plurality of nozzles 31), at a density of 50 dpi or more. In this case, by providing a plurality of arrays of the nozzles 31 aligning at that density, it is possible to effectively realize a high resolution at 1,200 dpi or more.

Further, in this embodiment, let Tm (μsec) be the pulse width of the main pulse Pm and AL (μsec) be the reciprocating conveyance time for the pressure wave in the individual flow channels 32. Then, the following expression (3) holds (in other words, Tm is set to let the following expression (3) hold). By virtue of this, it is possible to raise the discharge pressure.

$$AL \times 0.7 \leq Tm \leq AL \times 1.3 \quad (3)$$

AL is 6 μsec or less. If AL exceeds 6 μsec, then the pulse width Tm of the main pulse Pm becomes longer (accordingly one discharge period becomes longer) such that it is difficult to realize the drive at high frequency. In this embodiment, because AL is 6 μsec or less, the pulse width Tm of the main pulse Pm is short (accordingly one discharge period is short) such that it is easy to realize the drive at high frequency.

Tw is 1 μsec or more and Tc is also 1 μsec or more (see FIG. 5). It takes 1 μsec or so for the pulse to rise up or fall down. Further, there is some difference in time between rising up and falling down for each actuator 22$x$. If Tw or Tc is less than 1 μsec, then some of the plurality of actuators 22$x$ may fail to rise up or fall down completely. Therefore, the difference in time between rising up and falling down for each actuator 22$x$ may distinctly affect the discharge performance to give rise to variation of the discharge performance between the nozzles 31. In this embodiment, however, with Tw and Tc being 1 μsec or more, it is possible to prevent this problem.

The nozzles 31 are constructed from a metallic member (the plate 49 depicted in FIG. 3). Metals have a better quality of abrasion resistance than resins such as polyimide and the like. Therefore, there is little abrasion of the nozzles 31 even used over a long time, so that it is possible to realize stable discharges by the drive at high frequency.

Between the flow channel member 21 and the actuator member 22, there is arranged the sealing member 23 made of a different material from the piezoelectric layers 61 and 62. Accordingly, even if a crack emerges in the piezoelectric layers 61 and 62, the ink in the flow channel member 21 will not come into the crack of the piezoelectric layers 61 and 62 such that it is possible to prevent problems (such as short circuit between the electrodes 51 and 52 due to the ink entering the crack.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

In the above embodiment, the drive signal X (see FIG. 5) includes the prepulse Pp in addition to the main pulse Pm and the cancel pulse Pc within one discharge period (from the time t0 to the time t1). However, the prepulse Pp may be omitted.

In the above embodiment, the actuator is constructed from two layers including the individual electrodes and the common electrode. However, the actuator may be constructed from three layers (such as, for example, a structure including driver electrodes to which a high potential or a low potential is selectively applied, a high potential electrode kept at the high potential, and a low potential electrode kept at the low potential).

The head is not limited to a serial type but may be of a line type.

The ink discharging object is not limited to paper but may be cloths, substrates, plastic members, and the like.

The liquid discharged from the nozzles is not limited to inks but may be any liquids (such as processing liquids agglutinating or depositing ingredients of inks).

The present disclosure is not limited to application to printers but can be applied to facsimile devices, photocopy devices, multifunctional devices, and the like. Further, the present disclosure can also be applied to liquid discharge apparatuses used for other purposes than recording images (such as liquid discharge apparatuses of forming electrically conductive patterns by discharging an electrically conductive liquid to a substrate).

What is claimed is:

1. A liquid discharge apparatus comprising:

a channel member defining a nozzle and a pressure chamber in communication with the nozzle;

an actuator configured to apply pressure to liquid in the pressure chamber; and a controller configured to apply a drive signal to the actuator, wherein the drive signal includes a rectangular main pulse and a rectangular cancel pulse applied after the rectangular main pulse within one discharge period for forming one dot, the rectangular cancel pulse being smaller in pulse width than the rectangular main pulse, the actuator is driven by the drive signal in a pull-and-push method such that the liquid is discharged from the nozzle by increasing volume of the pressure chamber from a predetermined volume and then decreasing the volume of the pressure chamber to the predetermined volume or less, and if f (kHz) refers to a drive frequency of the drive signal, if Tw (μsec) refers to a time length from a falling edge of the rectangular main pulse to a rising edge of the rectangular cancel pulse, and if Tc (μsec) refers to a pulse width of the rectangular cancel pulse, then the following expression holds:

$$50 \leq f \leq -11.3 \times (Tw + Tc) + 120.$$

2. The liquid discharge apparatus according to claim 1, wherein if Q ($m^3$) refers to a maximum displacement of meniscus of the nozzle occurring after applying the rectangular cancel pulse, and if Tq (μsec) refers to a time length, within the one discharge period, from a start point of applying the drive signal to an occurring point of the maximum displacement, then the following expression holds:

$$f \leq -4\times10^{14}\times(Q\times Tq)+106.$$

3. The liquid discharge apparatus according to claim 1, wherein an image formed by the liquid discharged from the nozzle has resolution of 1,200 dpi or more.

4. The liquid discharge apparatus according to claim 3, wherein the channel member defines a plurality of nozzles including the nozzle, and the plurality of nozzles are aligned in a relative movement direction of a recording medium and the plurality of nozzles, at a density of 50 dpi or more.

5. The liquid discharge apparatus according to claim 1, wherein if Tm (μsec) refers to a pulse width of the rectangular main pulse, and if AL (Acoustic Length; μsec) refers to a reciprocating propagation time for a pressure wave in an individual flow channel including the pressure chamber and the nozzle, then the following expression holds:

$$\mathrm{AL}\times0.7\leq Tm\leq\mathrm{AL}\times1.3.$$

6. The liquid discharge apparatus according to claim 5, wherein the AL is 6 μsec or less.

7. The liquid discharge apparatus according to claim 1, wherein the Tw is 1 μsec or more, and the Tc is also 1 μsec or more.

8. The liquid discharge apparatus according to claim 1, wherein the channel member is a metallic member.

9. The liquid discharge apparatus according to claim 1, further comprising:

a sealing member arranged on a surface, of the channel member, in which the pressure chamber is open, the sealing member being configured to seal the pressure chamber; and an actuator member constructing the actuator, having a piezoelectric layer arranged on a surface, of the sealing member, opposite to the channel member, and an individual electrode formed on a surface, of the piezoelectric layer, opposite to the sealing member, wherein the sealing member is made of a material different from the piezoelectric layer.

* * * * *